United States Patent
Zils (12)

(10) Patent No.: US 6,328,079 B1
(45) Date of Patent: Dec. 11, 2001

(54) SEAM FOR A BELT FOR RECIRCULATION IN MACHINES, AND METHOD FOR THE MANUFACTURE

(75) Inventor: Frank Zils, Merzenich-Golzheim (DE)

(73) Assignee: Thomas Josef Heimbach Gesellschaft mit beschrankter Haftung & Co. (DE)

( * ) Notice: Subject to any disclaimer, the term of this patent is extended or adjusted under 35 U.S.C. 154(b) by 0 days.

(21) Appl. No.: 09/664,398

(22) Filed: Sep. 18, 2000

(30) Foreign Application Priority Data

Sep. 18, 1999 (DE) ................................. 199 44 864

(51) Int. Cl.[7] ............................. D03D 3/04; D03D 41/00; D21F 7/10; D21F 1/00
(52) U.S. Cl. ................................ 139/383 AA; 198/844.2; 24/33 P; 24/33 K
(58) Field of Search .................. 198/844.2; 24/33 P, 24/33 K; 139/383 AA

(56) References Cited

U.S. PATENT DOCUMENTS

| | | | |
|---|---|---|---|
| 2,077,891 | * | 4/1937 | Milnes ...................................... 24/33 |
| 3,309,790 | * | 3/1967 | Macbean ................................. 34/243 |
| 3,324,516 | | 6/1967 | Dutt ......................................... 24/33 |
| 3,324,991 | * | 6/1967 | Voss ...................................... 198/193 |
| 3,972,105 | | 8/1976 | Miller et al. . | |
| 4,344,209 | | 8/1982 | Harwood . | |
| 4,469,221 | | 9/1984 | Albert . | |
| 4,574,435 | | 3/1986 | Luciano et al. . | |
| 5,148,838 | * | 9/1992 | Lee .................................. 139/383 AA |
| 6,053,308 | * | 4/2000 | Vogrig et al. ...................... 198/844.2 |

FOREIGN PATENT DOCUMENTS

| | | |
|---|---|---|
| 236136 | 2/1910 | (DE) . |
| 6803127.6 | 3/1969 | (DE) . |
| 2256244 | 11/1971 | (DE) . |
| 3735709 | 5/1989 | (DE) . |
| 0171891 | 2/1986 | (EP) . |
| 0185907 | 10/1989 | (EP) . |
| 0564436 | 10/1993 | (EP) . |
| 0763623 | 3/1997 | (EP) . |
| 982682 | 2/1965 | (GB) . |
| 2060016 | 4/1981 | (GB) . |
| 96/34146 | 10/1996 | (WO) . |
| 9916966 | 4/1999 | (WO) . |

* cited by examiner

Primary Examiner—Andy Falik
(74) Attorney, Agent, or Firm—Liniak, Berenato, Longacre & White, LLC

(57) ABSTRACT

The invention is a seam for joining opposed ends of a belt for recirculation in machines. The seam comprises a reinforcing wire and at least two elongated coupling elements, each of which extends in the transverse belt direction. Each of the coupling elements comprises first and second sides and a row of coupling loops along the first side. The reinforcing wire extends through one of the coupling elements adjacent the second side. Coupling loops of two adjacent coupling elements are cooperable in such that they may be overlapped to result in a passthrough channel extending in the transverse belt direction and through which a coupling wire can be inserted. Each of the coupling elements is configured as a tubular coupling sleeve having cutouts. The cutouts are configured complementarily to the coupling loops such that coupling loops of one coupling element of a pair of adjacent coupling sleeves fit into cutouts of another coupling element of the pair of adjacent coupling elements.

16 Claims, 4 Drawing Sheets

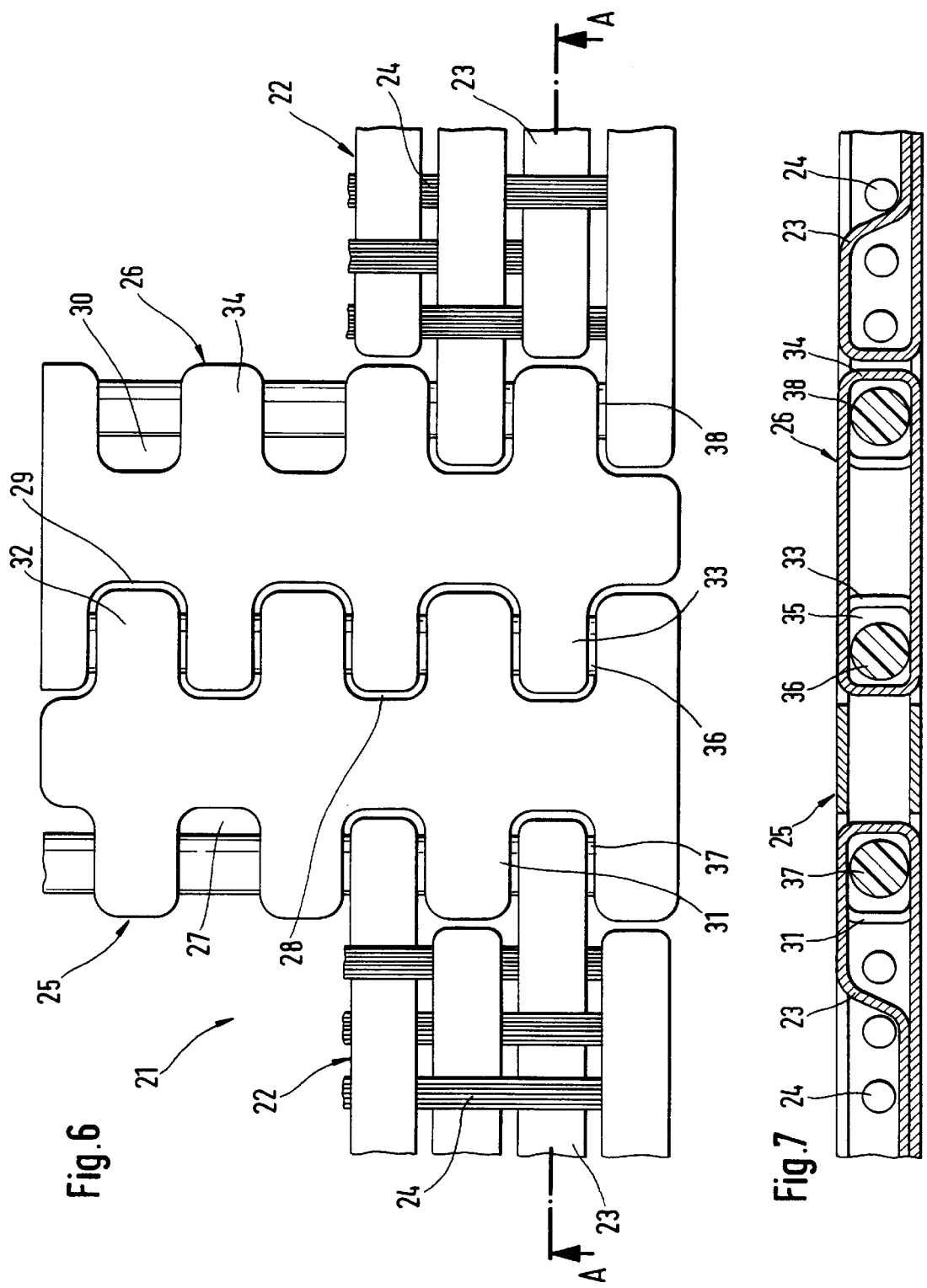

SEAM FOR A BELT FOR RECIRCULATION IN MACHINES, AND METHOD FOR THE MANUFACTURE

FIELD OF THE INVENTION

The invention concerns a belt for recirculation in machines, for example in paper machines, having at least two elongated coupling elements, extending in the transverse belt direction, which have coupling loops on the mutually facing sides, such that the coupling loops of two coupling elements can be caused to overlap so as to result in a passthrough channel, extending in the transverse belt direction, through which a coupling wire can be inserted.

BACKGROUND

Especially in machines in which webs or films are transported, for example in paper machines, long and wide belts which recirculate in the machine and in that context support the webs or films are used. In paper machines these are predominantly textile felts or wires whose base is a woven or knitted fabric. One or more fiber layers are then needle-felted onto that base in order to manufacture felts. Felts of this kind are used in particular in the press section of a paper machine, whereas wires are utilized in the sheet-forming region and in the dryer section.

SUMMARY OF THE INVENTION

In many cases the belts are not endless but rather are manufactured at a specific length. The ends are then connected together via a seam, either before being introduced into the machine or only in the machine itself In this context, the so-called inserted-wire seam has proven successful over time. With this seam, there are provided at the mutually facing ends of the belt a plurality of spaced-apart coupling loops that, for closing purposes, are caused to overlap so as to form a passthrough channel, extending in the transverse belt direction, that is enclosed alternatingly by the coupling loops of the two ends. A coupling wire, which connects the two ends of the belt in the manner of a hinge, is then inserted into this passthrough channel. Several coupling wires can also be provided parallel to one another.

A number of systems are known for configuring the coupling loops. In U.S. Pat. No. 4,344,209 and DE-A-2 256 244 (FIGS. 9 and 10), the coupling loops are formed by U-shaped clips that hook into the ends of the belt. The seams produced by way of these coupling loops are referred to as clipper seams. It is also known, from U.S. Pat. No. 3,972,105, to form each coupling loop by way of a U-shaped sheet-metal element, the limb of each sheet-metal element being connected to the associated end of the belt. A plurality of cutouts are shaped into the sheet-metal elements to create coupling projections with the coupling loops, the coupling projections and the cutouts being complementary to one another.

The seam forms described above have for the most part been replaced by inserted-wire seams, in which the respective coupling loops are formed by a coupling coil extending beyond the belt ends (cf. DE-A-2 256 244, U.S. Pat. No. 4,574,435, EP-B-0 185 907, EP-A-0 564 436). The connection between the coils and the ends of the belt is accomplished either by way of particular seam threads or by way of the longitudinal threads of the belt itself, which wrap around the turns of the coil. An inserted wire can additionally be inserted into the coil at the wrap-around points. To couple the ends of the belt, the coils can be caused to overlap so as to form a straight passthrough channel through which the coupling wire can then be pushed.

Also known, in particular for use in the dryer section of a paper machine, are so-called wire element belts in which the entire belt is constituted by coils, extending in the transverse direction, which overlap one another in such a way as to create passthrough channels into which coupling wires can be slid (cf., for example, EP-A-0 171 891). As an alternative to the coils, it has been proposed to provide a plurality of links (cf U.S. Pat. No. 4,469,221) or oval rings (cf. EP-A-0 763 623, WO 99/16966) arranged next to one another, which connect the coupling wires to one another. Lastly, DE-A-37 35 709 proposes to configure the coupling elements as elongated shaped elements, made of plastic and extending in the transverse belt direction, which have coupling loops that wrap around the coupling wires.

The known inserted-wire seams are, like the clipper seams, usable only to a limited extent, or (as in the case of the coupling coils) present difficulties in terms of being overlapped at the correct pitch, especially if the belt is more than 10 m wide. In addition, the strength of such inserted-wire seams is not always sufficient to meet stringent requirements.

It is therefore the object of the invention to configure the coupling elements in a belt of the kind cited initially in such a way that a high-strength inserted-wire seam can be produced in simple fashion; and that it also accordingly becomes easier to manufacture a belt that is assembled exclusively from coupling elements connected by way of coupling wires. A further object is to make available a suitable manufacturing method.

The former object is achieved, according to the present invention, in that the coupling elements are configured as coupling sleeves that, in order to form the coupling loops, have cutouts which are configured complementarily to the coupling loops of the respective adjacent coupling sleeve and into which they fit in the coupled state. According to the invention, the coupling elements are thus manufactured from sleeve-like structures into which gap-forming cutouts are shaped on at least one long side, thus creating the coupling loops. Because of the complementary configuration of the cutouts and coupling loops, the latter can, as in the case of the known inserted-wire seams, be caused to overlap to form a passthrough channel, so that a coupling wire can be inserted through the coupling loops to connect the coupling elements and thus the ends of the belt to one another. In this context, the cutouts can be adapted as desired to particular requirements so that the coupling loops can easily be caused to overlap at the proper pitch even with very wide belts, so that the coupling wire can be slid through easily and quickly.

The sleeve shape imparts high strength to the coupling elements. The mechanical and chemical properties can be adapted to particular operating conditions by way of a corresponding choice of material, i.e. materials can be used that ensure good abrasion resistance, elasticity, dimensional stability, etc. The same applies to the chemical properties.

In addition, the cutouts can be provided in such a way that the permeability in the seam region differs little from that in the remaining region of the belt, i.e. in this respect as well, there is great freedom in the design of the coupling elements. The flexibility of the coupling elements furthermore ensures that the seam region adapts well to the press and reversing rolls and to the web that is being transported.

In an embodiment of the invention, provision is made for the belt to have at least one pair of adjacent coupling sleeves, i.e. in this case the coupling sleeves are used only to form one or more inserted-wire seams, while the remainder of the belt is configured conventionally, for example as needle felt with a base woven or knitted fabric, or as a sieve fabric. In this case provision is made for the pair or pairs of coupling sleeves to have cutouts and coupling loops only on the mutually facing long sides, and for the coupling sleeves to be connected to the remainder of the belt via threads that surround the cutouts. It is advantageous in this context that reinforcing wires, which are also surrounded by the threads, are additionally placed into the coupling sleeves.

As an alternative to this, provision can be made for the pair or pairs of coupling sleeves to have cutouts and coupling loops on both long sides, and for coupling wires, which are connected to the remainder of the belt by way of threads which surround them, also to sit in the coupling loops on the long sides facing away from one another. In both cases, the threads can be additional seam threads. It is more advantageous, however, if the threads used are the longitudinal threads extending in the remainder of the belt, by the fact that they are guided around the respective associated coupling element or coupling wire and woven back in again.

The advantages of the coupling elements configured according to the present invention, namely in particular their ease of coupling and favorable manufacturing costs, can also be used to assemble the entire belt from coupling elements of this kind, coupled to one another in each case with coupling wires, thus creating an endless and uniform belt whose surface is determined substantially by the coupling elements and their conformation. The permeability of this belt is then determined by the gaps in the region of the cutouts. It is additionally possible, however, to shape passthrough holes into the coupling elements in order to increase the permeability perpendicular to the surfaces. Instead of or in combination with this, however, the gaps between the coupling loops can also be dimensioned such that the desired permeability is achieved.

A further manufacturing step comprises placement of the plastic sleeves with their long sides next to one another, and connection of two plastic sleeves in each case to one another by inserting coupling wires into the respective passthrough channels, in a manner similar to that for wire element belts comprising wire coils and coupling wires.

The invention is elucidated in more detail, with reference to exemplary embodiments, in the drawings, in which:

BRIEF DESCRIPTION OF THE DRAWINGS

FIG. 6 shows a plan view of the seam region of a further paper machine belt;

FIG. 7 shows a cross section through the seam region of the paper machine belt shown in FIG. 6, in plane A—A;

DETAILED DESCRIPTION OF THE INVENTION

Figure 1:
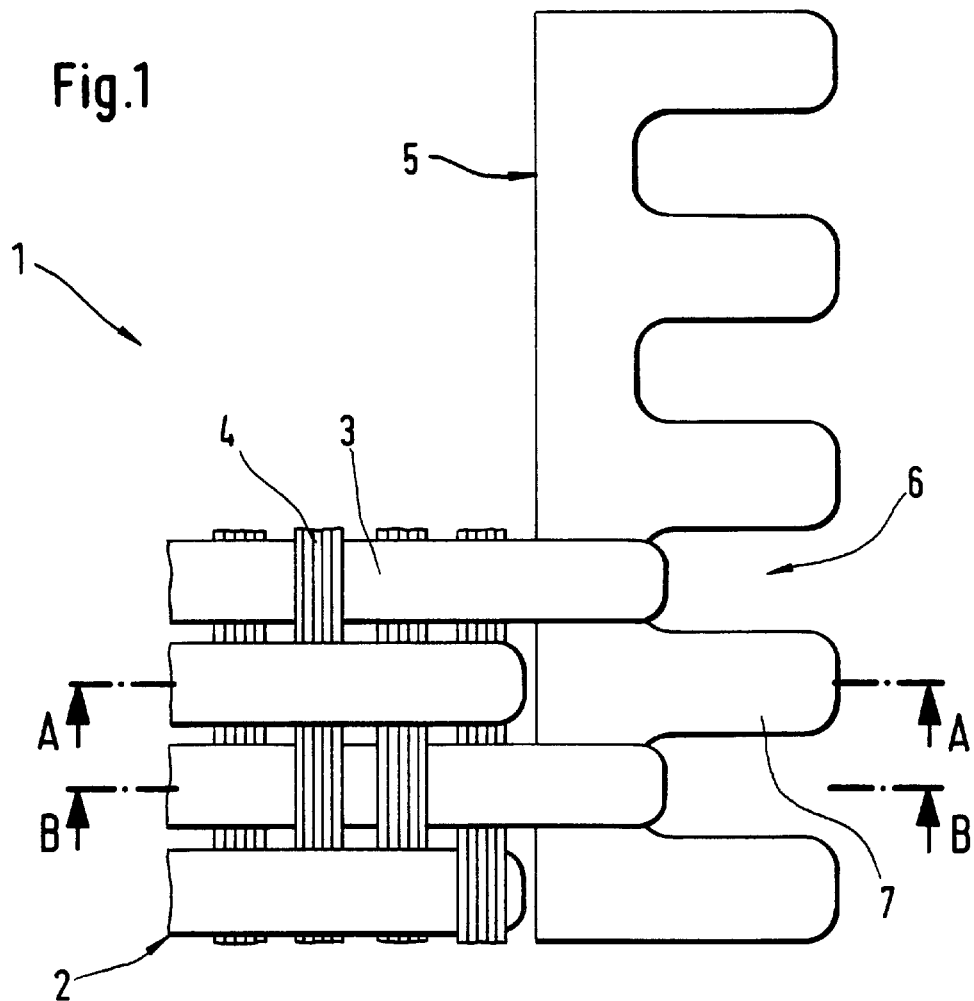
FIG. 1 shows a paper machine belt having a coupling sleeve at one end, in plan view.

FIG. 1 depicts a portion of the end region of a paper machine belt 1. Paper machine belt 1 substantially (i.e. except for the seam configuration) comprises a woven fabric 2 having longitudinal threads (labeled 3 by way of example) and transverse threads (labeled 4 by way of example) that are woven together. The woven fabric structure depicted continues both in the longitudinal direction (section planes A—A and B—B) and in the transverse direction.

Figure 3:
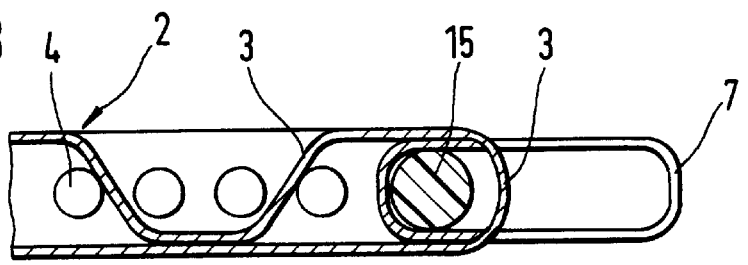
FIG. 3 shows a cross section through a paper machine belt as shown in FIG. 1, in plane B—B.

A coupling sleeve 5 is connected to the end of woven fabric 2. This coupling sleeve 5 has U-shaped cutouts (labeled 6 by way of example) that are punched or cut out of coupling sleeve 5. The spacings of cutouts 6 are dimensioned such that every second longitudinal thread 3 fits into a cutout 6 and thus wraps around coupling sleeve 5. Longitudinal threads 3 are then woven back again so that a permanent connection is created between coupling sleeve 5 and woven fabric 2. This is evident in particular from FIG. 3. It is apparent in this context that there is additionally placed, in the region of coupling sleeve 5 adjacent to the end of woven fabric 2, a reinforcing wire 8 made, for example, of a plastic material, that is also surrounded by the longitudinal threads that fit through cutouts 6 and that imparts stability to coupling sleeve 5 in this region.

Figure 2:
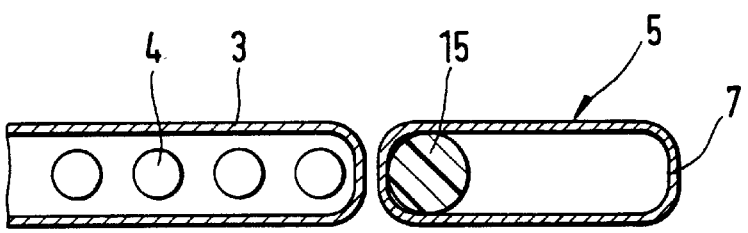
FIG. 2 shows a cross section through the paper machine belt shown in FIG. 1, in plane A—A.
Figure 4:
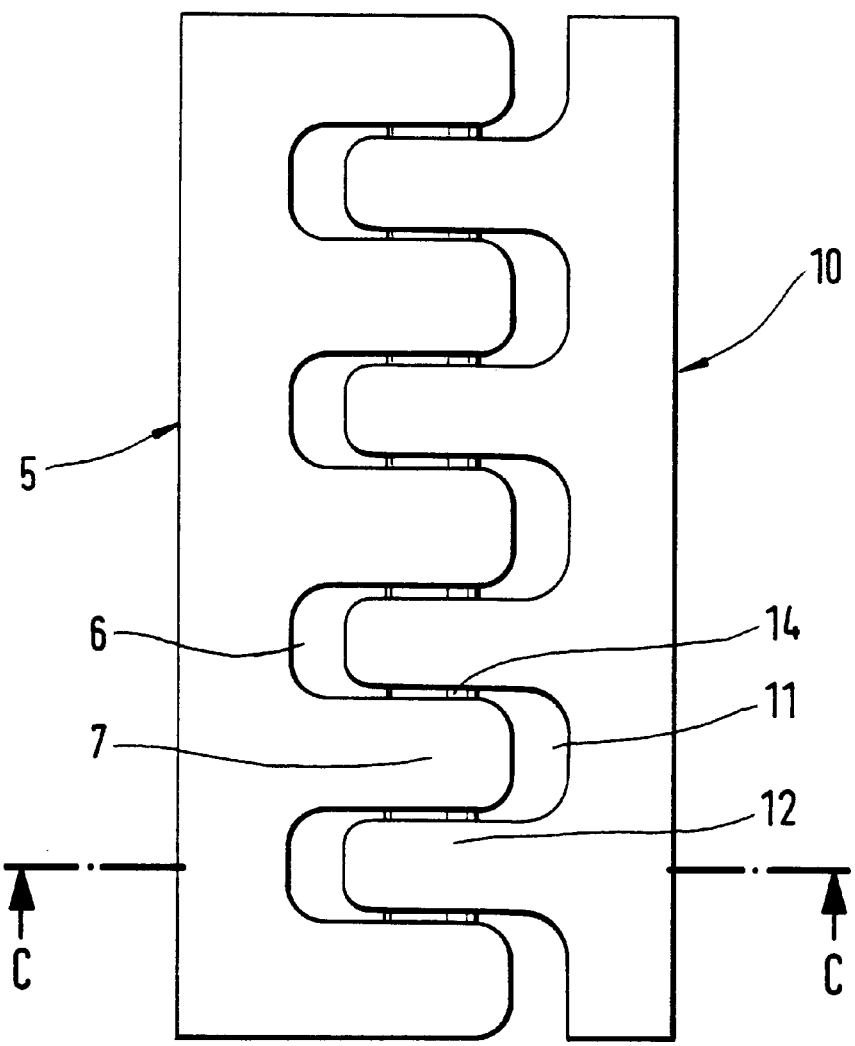
FIG. 4 shows two coupling elements of the paper machine belt shown in FIGS. 1 through 3 coupled to one another.

The shaping of cutouts 6 results in the creation between them of coupling loops (labeled 7 by way of example) which are evident in particular from FIG. 2. With the aid of these coupling loops 7, a connection can be made to a complementary coupling sleeve 10, as is evident from FIG. 4. Here the two coupling sleeves 5, 10, are depicted in a position overlapping one another, but without the end regions of woven fabric 2 that are adjacent on the respective mutually facing sides. The connection between the right-hand coupling sleeve 10 and woven fabric 2 was made in the same manner as the connection, visible in FIG. 1, of left-hand coupling sleeve 5.

Figure 5:
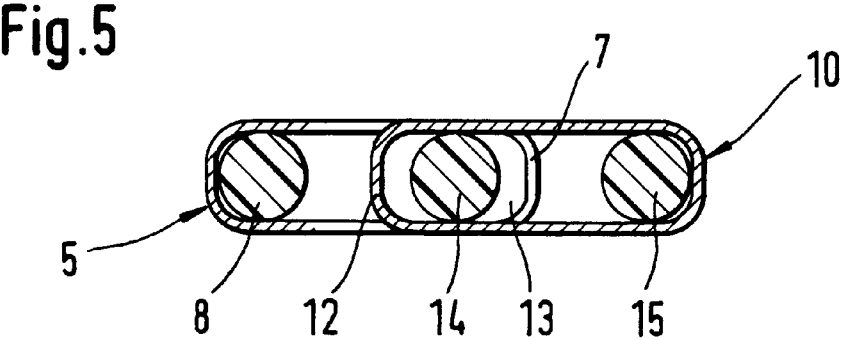
FIG. 5 shows a cross section through the coupling elements shown in FIG. 4, in plane C—C.

Coupling sleeve 10 also has cutouts (labeled 11 by way of example) and coupling loops (labeled 12 by way of example). Coupling loops 7, 12 of the two coupling sleeves 5, 10 are caused to overlap, by being fitted into cutouts 6, 11 of the respectively opposite coupling sleeve 5, 10, in such a way as to create, as is apparent especially from FIG. 5, a straight passthrough channel 13 that is enclosed alternatingly by coupling loops 7, 12 of the coupling sleeves 5, 10. A coupling wire 14 made of a suitable plastic passes through passthrough channel 13 and creates the connection between the two coupling sleeves 5, 10 and thus between the ends of woven fabric 2. As in the case of left-hand coupling sleeve 5, in the case of right-hand coupling sleeve 10, a reinforcing wire 15 is also placed into the region facing the ends of paper machine belt 1.

FIGS. 6 and 7 depict a portion of a second paper machine belt 21. It, too, has a woven fabric 22 with longitudinal threads (labeled 23 by way of example) and transverse threads (labeled 24 by way of example) that are woven together. The ends of woven fabric 22 are each connected to a coupling sleeve 25, 26. In contrast to coupling sleeves 5, 10 in the exemplary embodiment shown in FIGS. 1 through 5, here coupling sleeves 25, 26 each have cutouts (labeled 27, 28, 29, 30 by way of example) on both long sides, which are cut or punched out of coupling sleeves 25, 26. This results in the creation of respective rows of coupling loops (labeled 31, 32, 33, 34, by way of example). On the mutually facing long sides of coupling sleeves 25, 26, coupling loops 32, 33 of the one coupling sleeve 25, 26 respectively fit alternatingly into the respectively opposite cutouts 28, 29 of the other coupling sleeve 25, 26. This results in a straight passthrough channel 35 which, in the coupled state shown, is penetrated by a coupling wire 36 and thereby creates a hinge-like connection between the end faces of woven fabric 22.

On the long sides of coupling sleeves 25, 26 facing away from each other, coupling loops 31, 34 are also each penetrated by a coupling wire 37, 38. In cutouts 27, 30, every second longitudinal thread 23 of woven fabric 22 wraps around the two coupling wires 37, 38, these longitudinal threads 23 then being woven back into woven fabric 22 as shown especially in FIG. 7. This wrapping creates a permanent connection between woven fabric 22 and the respective coupling sleeve 25, 26.

Figure 8:
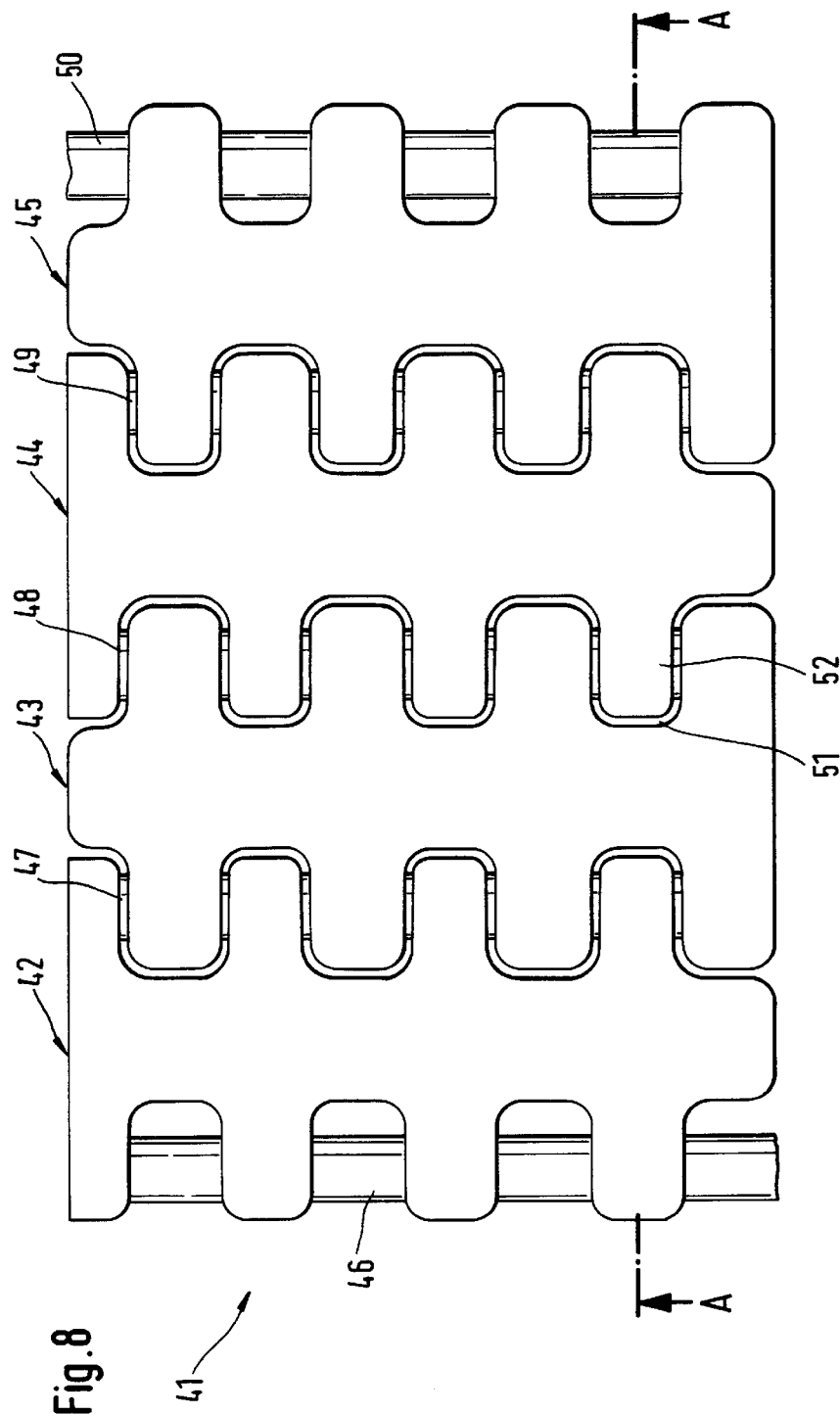
FIG. 8 shows a plan view of a third paper machine belt comprising coupling sleeves and coupling wires.
Figure 9:
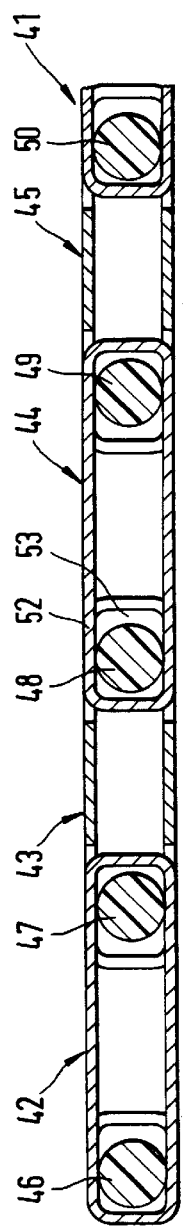
FIG. 9 shows a cross sect ion through the paper machine belt shown in FIG. 8.

FIGS. 8 and 9 depict a portion of a paper machine belt 41 that, in contrast to paper machine belts 1, 21 shown in FIGS. 1 through 7, is assembled exclusively from coupling sleeves 42, 43, 44, 45 and coupling wires 46, 47, 48, 49, 50. Coupling sleeves 42, 43, 44, 45 are configured in the same manner as coupling sleeves 25, 26 for configuring the seam shown in FIGS. 6 and 7. They therefore have on both long sides cutouts (labeled 51 by way of example) into which coupling loops (labeled 52 by way of example) of the respective adjacent coupling sleeve 42, 43, 44, 45 respectively fit. Two adjacent coupling sleeves 42, 43, 44, 45 form, as a result of the overlap of coupling loops 52, straight passthrough channels (labeled 53 by way of example) in each of which sits a coupling wire 46, 47, 48, 49, 50. By placing together a plurality of uniformly identical coupling loops 42, 43, 44, 45 in the manner shown, and connecting them using coupling wires 46, 47, 48, 49, 50, it is possible to produce a paper machine belt 41 of any desired length, the width of said paper machine belt 41 being determined by the lengthwise extension of coupling sleeves 42, 43, 44, 45.

The coupling sleeves 5, 10, 25, 26 have a tubular cross section. Preferably, the coupling sleeves 5, 10, 25, 26 have an oval cross section, but can also have a rectangular cross section in which flat upper and lower sides are formed that lie flush with the remainder of the belt 1, 21, 41.

The material provided for the coupling sleeves 5, 10, 25, 26 is a plastic material adapted to the particular application; epoxies (EP), acrylates (A), polyurethane (PUR), poly(vinyl alcohol) (PVA) as a dissolvable component, polyethylene terephthalate (PET), polyphenylene sulfide (PPS), and polyetheretherketone (PEEK) can be used, in particular for this purpose, and the materials can also be equipped with glass fiber reinforcement. In order to improve strength in particular for severe stresses, the plastic sleeves should have an internal reinforcement, for example in the form of a sleeve-shaped woven fabric, knitted fabric, layer, braid, or network, etc., polyethylene terephthalate (PET), polyamide (PA) such as PA-6, PA-6,6, PA-11, or PA 12, polyphenylene sulfide (PPS), polyetheretherketone (PEEK), or aramid (AR) being particularly suitable. The reinforcement can then be coated, for example in the course of an extrusion operation in the manner of pressure hoses or oil hoses.

The thickness of the coupling sleeves 5, 10, 25, 26 can be 1 to 4 mm, and the extension in the longitudinal direction 3 to 25 mm. Other formats are, of course, also conceivable.

What is claimed is:

1. A seam for joining opposed ends of a belt (1, 21, 41) for recirculation in machines, said seam comprising a reinforcing wire (8, 15) extending in a transverse belt direction and at least two elongated coupling elements (5, 10, 25, 26, 42 through 45) extending in said transverse belt direction, each of said coupling elements comprising first and second sides and a row of coupling loops (9, 12, 31 through 34, 52) along said first side, said reinforcing wire (8, 15) extending through one of said coupling elements adjacent said second side, the coupling loops (9, 12, 31 through 34, 52) of two adjacent coupling elements cooperable such that they may be overlapped to result in a passthrough channel (13, 35, 53) extending in said transverse belt direction and through which a coupling wire (14, 35, 46 through 49) can be inserted;

wherein each of said coupling elements is configured as a tubular coupling sleeve (5, 10, 25, 26, 42 through 45) having cutouts (5, 27 through 30, 51), said cutouts being configured complementarily to said coupling loops (9, 12, 31 through 34, 52) such that coupling loops (9, 12, 31 through 34, 52) of one coupling element of a pair of adjacent coupling sleeves fit into cutouts of another coupling element of said pair of adjacent coupling elements.

2. The seam as defined in claim 1, characterized in that it has at least one pair of adjacent coupling sleeves (5, 10, 25, 26).

3. The seam as defined in claim 2, characterized in that the pair or pairs of coupling sleeves (25, 26) have cutouts (27 through 30) and coupling loops (31 through 34) on each of said sides; and that reinforcing wires (37, 38), which are connected to the remainder (22) of the belt (21) by way of threads (23) which surround said reinforcing wires, sit in the coupling loops (31, 34) adjacent said sides.

4. The seam as defined in claim 1, characterized in that the pair or pairs of coupling sleeves (5, 10) have cutouts (6, 11) and coupling loops (7, 12) only said first side, and the coupling sleeves (5, 10) are connected to the remainder (2) of the belt (1) via threads (3) that surround the cutouts (6, 11).

5. The seam as defined in claim 4, characterized in that said threads (3, 23) are part of a woven fabric (2, 22) or knitted fabric.

6. The seam as defined in claim 1, characterized in that the entire belt (41) comprises a plurality of coupling sleeves (42 through 45) placed next to one another which are interconnected via coupling wires (46 through 49).

7. The seam as defined in claim 1, characterized in that the coupling sleeves (5, 10, 25, 26, 42 through 45) have an oval cross section.

8. The seam as defined in claim 1, characterized in that the coupling sleeves (5, 10, 25, 26, 42 through 45) have flat upper and lower sides that lie flush with the remainder of the belt (1, 21, 41).

9. The seam as defined in claim 1, characterized in that the coupling sleeves (5, 10, 25, 26, 42 through 45) are made of a plastic material.

10. The seam as defined in claim 1, characterized in that the coupling sleeves (5, 10, 25, 26, 42 through 45) have an internal reinforcement.

11. The seam as defined in claim 1, characterized in that the thickness of the coupling sleeves (5, 10, 25, 26, 42 through 45) is 1 to 4 mm, and the extension in the longitudinal belt direction is 3 to 25 mm.

12. A method for manufacturing a seam as defined in claim 1, characterized in that first the coupling sleeves (5, 10, 25, 26, 42 through 45) are manufactured, and then the cutouts (6, 11, 27 through 30, 50) in the coupling sleeves (5, 10, 25, 26, 42 through 45) are punched, cut, or milled out.

13. The method as defined in claim 12, characterized in that in order to manufacture the coupling sleeves (5, 10, 25, 26, 42 through 45), a sleeve-shaped reinforcement is equipped with a plastic coating.

14. The method as defined in claim 12 or 13, characterized in that the coupling sleeves (5, 10, 25, 26, 42 through 45) are extruded.

15. The method as defined in claim 12, characterized in that the coupling sleeves (5, 10, 25, 26, 42 through 45) are placed with said sides next to one another, and two coupling sleeves (42 through 45) in each case are connected to one another by inserting a coupling wire (46 through 49) into the respective passthrough channel (42).

16. A seam for joining opposed ends of a belt for recirculation in machines, said seam comprising:

a reinforcing wire extending in a transverse belt direction;

at least two elongated tubular coupling elements extending in a transverse belt direction, each of said coupling elements comprising first and second sides and a row of coupling loops adjacent said first side;

wherein at least two of said coupling elements are adjacent one another;

wherein coupling loops of said at least two adjacent coupling elements are at least partially overlapped to form a channel through which a coupling wire may be inserted; and wherein said reinforcing wire extends through one of said coupling elements adjacent said second side.

\* \* \* \* \*